United States Patent [19]

Levy

[11] 3,917,890
[45] Nov. 4, 1975

[54] COMPOSITE TAPE AND METHOD OF FORMING THE SAME

[76] Inventor: Sidney Levy, 145 W. Cuthbert Blvd., Oaklyn, N.J. 08107

[22] Filed: Mar. 14, 1973

[21] Appl. No.: 341,238

Related U.S. Application Data

[63] Continuation-in-part of Ser. No. 887,990, Dec. 24, 1969, abandoned.

[52] U.S. Cl. ............... 428/228; 156/244; 156/298; 156/322; 428/251; 428/268; 428/278; 428/284; 428/415; 428/426; 428/500
[51] Int. Cl.² .. D04B 1/00; B32B 17/02; D03D 17/00
[58] Field of Search ......... 161/93, 94, 95, 170, 151; 156/244, 176, 179, 298, 322; 428/228, 251, 268, 278, 284, 415, 426, 500

[56] References Cited
UNITED STATES PATENTS

| | | | |
|---|---|---|---|
| 2,545,370 | 3/1951 | Mittelmann | 156/322 |
| 3,222,237 | 12/1965 | McKelvy | 161/95 |
| 3,230,127 | 1/1966 | Cleereman | 156/244 |
| 3,582,456 | 6/1971 | Stolki | 161/170 |
| 3,616,130 | 10/1971 | Rogosch | 161/93 |

*Primary Examiner*—Marion E. McCamisa
*Attorney, Agent, or Firm*—Friedman & Goodman

[57] ABSTRACT

A method of forming a composite tape having a foraminous fiberglass core includes the step of treating a continuous strip of foraminous material with adhesion promoting and stiffening material. The treated strip is preheated to a temperature approximately equal to the extruding temperature of two ribbons of flexible vinyl thermoplastic material which are simultaneously formed in a subsequent step and coated on each side of the heated fiberglass core material. The coated tape is then progressively compressed to impart to the composite tape uniform desired thickness. Such compression also forces at least portions of the extruded two ribbons into the interstices of the foraminous core material to cause the opposing ribbons to fuse to each other by penetrating and filling the interstices to form a unitary mass. The composite tape is then cooled to substantially room temperature wherein the final plastic coating hardens. The resulting composite tape comprises an elongate foraminous strip of fiberglass core material. A coating of a flexible vinyl polymer thermoplastic material having substantially uniform thickness encloses the core material along its length. The coating comprises two opposing ribbons one on each side of the strip at least portions of which penetrate and fill the interstices to form a unitary bonded mass.

19 Claims, 2 Drawing Figures

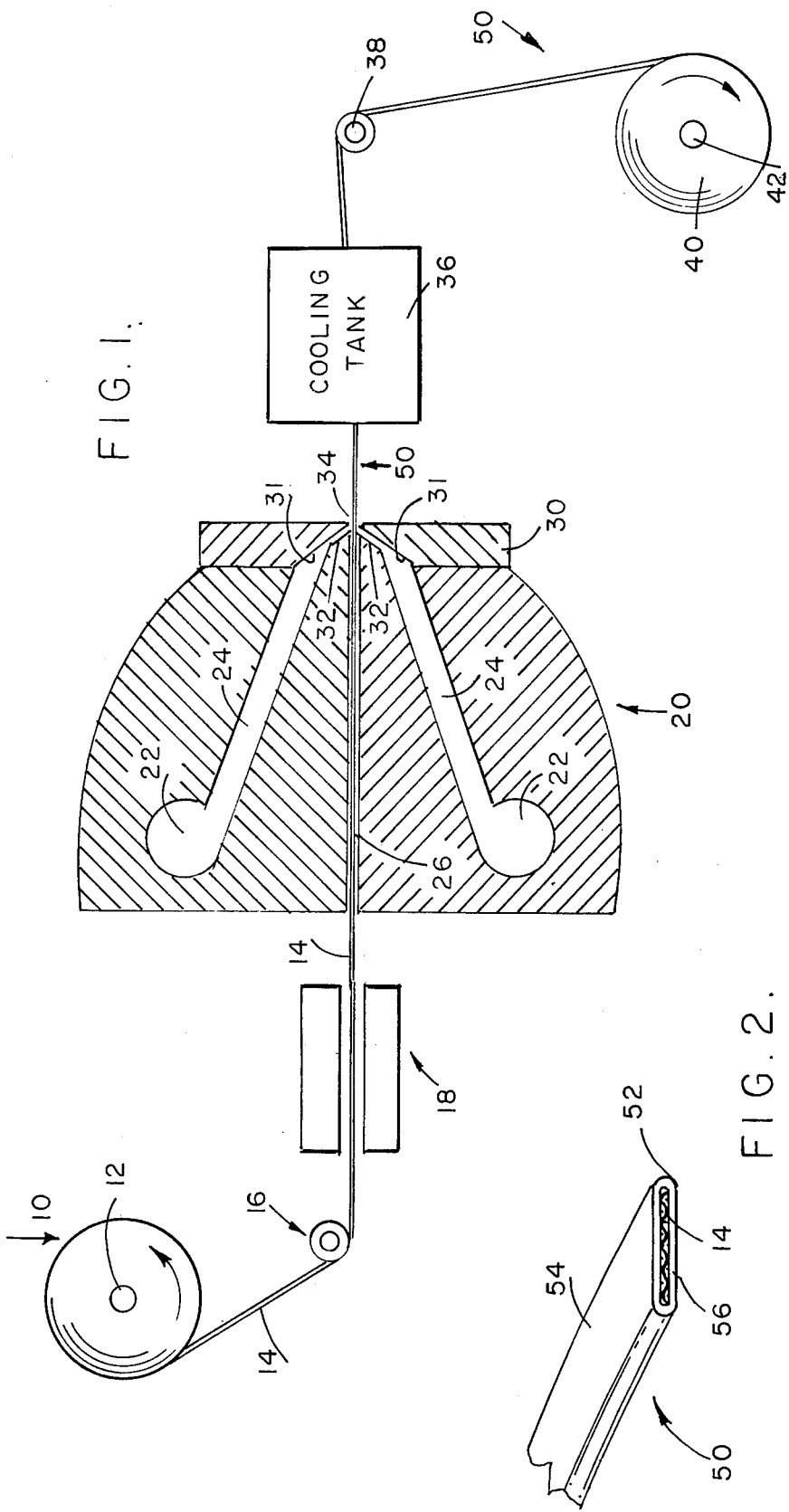

COMPOSITE TAPE AND METHOD OF FORMING THE SAME

CROSS REFERENCE TO RELATED APPLICATION

This application is a continuation-in-part application of my copending application Ser. No. 887,990, filed Dec. 24, 1969, now abandoned.

BACKGROUND OF THE INVENTION

The present invention generally relates to a method of forming tape materials and the product resulting therefrom, and more particularly a method of forming a composite tape having a foraminous fiberglass core and the composite tape resulting therefrom.

While some composite tapes are known which have low stretch coefficients, these tapes are generally expensive to manufacture and many are inconvenient to use.

Other known tapes have low resistance to mistreatment, bending, folding and so forth and break or wrinkle with prolonged use. Some of these tapes tend to crack or take a permanent kink when the tape is mishandled. Generally, a reliable tape which is inexpensive to use, and which remains useful over prolonged use and over wide temperature ranges are not presently known. Most of the presently known tapes have low tensile strengths which further reduces their usefulness.

SUMMARY OF THE INVENTION

Accordingly, it is an object of the present invention to provide a composite tape which is not possessed of the above described disadvantages associated with prior art tapes.

It is another object of the present invention to provide a composite tape of the type under discussion which is simple in construction and economical to manufacture.

It is still another object of the present invention to provide a method of forming a composite tape as above described.

It is yet another object of the present invention to provide a composite tape which is provided with a foraminous fiberglass core material coated by a flexible vinyl polymer thermoplastic material.

It is a further object of the present invention to provide a composite tape wherein the foraminous material represents an effective open area of approximately between 20 and 60% and wherein the tape is covered by a flexible thermoplastic coating which penetrates and fills the interstices of the foraminous material to form a unitary bonded mass.

It is still a further object of the present invention to provide a composite tape which has a very low stretch factor.

It is yet a further object of the present invention to provide a composite tape which comprises a fiberglass woven core material and a flexible vinyl thermoplastic outer coating and an adhesion promoting and stiffening agent between the fiberglass and the plastic coating.

It is an additional object of the present invention to provide a composite tape which may be formed on a continuous, efficient basis by simultaneously extruding two ribbons of flexible vinyl thermoplastic material on an advancing fiberglass strip of material.

It is another object of the present invention to provide a composite tape which is flexible, resistant to mistreatment, bending, folding and so forth and which does not wrinkle or crack or take permanent kinks.

In order to achieve the above objects, as well as others which will become apparent hereafter, a method of forming a composite tape having a foraminous fiberglass core comprises the step of treating a continuous strip of foraminous material with adhesion promoting and stiffening material. The continuous strip of foraminous core material is then preheated and two ribbons of flexible thermoplastic material are simultaneously extruded, coating each side of the fused fiberglass material with one of the respective ribbons. The core material is then progressively compressed to thereby impart the composite tape a uniform desired thickness and forcing at least portions of said extruded two ribbons into the interstices of the foraminous fiberglass core material. The resulting composite material is then cooled to a temperature which substantially hardens the coated plastic ribbon material. According to a presently preferred embodiment of the method, said treating step comprises advancing the continuous strip of foraminous fiberglass material into a low viscosity bath of acrylic emulsion solution which improves adhesion between the fiberglass core material and the vinyl plastic polymer coating. When treating the core material in this manner, the acrylic emulsion solution is advantageously thinned to 20% solids by weight by addition of water. The treated fiberglass strip is advantageously dried prior to the extrusion step to reduce the residual volatile solvents and water to under 10%. It is also advantageous to remove excess acrylic emulsion solution subsequent to advancing the strip through the bath and prior to drying the treated strip.

In the pre-heating step, the fiberglass material is heated to further reduce the volatile emulsion solution to 1 to 2%. The preheating step is performed at a temperature which is substantially equal to the extrusion temperature of the ribbons of plastic material — this being approximately between 335° and 365°F.

In order to achieve the composite tape product of uniform thickness and quality, the fiberglass strip is advantageously tensioned prior to said preheating step. The extruding step comprises extruding the flexible vinyl polymer thermoplastic material which contains non-migratory epoxy-type plasticizers.

An important feature of the present invention is the provision of a woven foraminous fiberglass material which has interstices which represent an effective unfilled open area of approximately between 20 and 60%. The compressing step comprises progressively applying increased pressure to the coated core material causing the opposing ribbons to fuse to each other by penetrating and filling said interstices to form a unitary mass. The cooling step of the method comprises the step of quenching the composite tape in a cooling tank to essentially room temperature.

A composite tape in accordance with the present invention comprises an elongate foraminous strip of woven fiberglass core material. A coating of flexible vinyl polymer thermoplastic material having substantially uniform thickness encloses said core material along its length. The coating comprises two opposing ribbons one on each side of said strip at least portions of which penetrate and fill the interstices to form a unitary bonded mass. The fiberglass core material is so selected so that the unfilled interstices in the strip represent an open area of approximately between 20 and 60% of the entire surface area. Advantageously, said vinyl polymer thermoplastic contains non-migratory epoxy-type plasticizers. In accordance with the presently preferred composite tape, the tape further comprises an adhesion promoting and stiffening agent between said strip of fiberglass and said vinyl plastic material. The agent contains residual volatiles plus water under 2% of the total weight.

The method and resulting tape in accordance with the present invention represent improvements which substantially reduce or eliminate the above described disadvantages inherent in the prior art methods and tapes.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 is a schematic representation of the various steps of the method in accordance with the present invention, showing the steps of forming the composite tape from a roll of pre-treated fiberglass core material; and FIG. 2 is a perspective view of a portion of the resulting composite tape formed in accordance with the method illustrated in FIG. 1.

DETAILED DESCRIPTION OF THE PREFERRED EMBODIMENTS

Referring now to the drawings, particularly to FIG. 1, a schematic representation of the apparatus which may be utilized to carry out the method in accordance with the present invention is shown. A supply roll 10 of woven foraminous fiberglass strip material is conventionally rotatably mounted on a shaft 12 for rotation in the direction of the arrow. The fiberglass tape 14 may be continuously paid off the supply roll 10 — the tension in the fiberglass 14 being controlled by a tensioning idler roller 16 which may also control the feed rate at which the fiberglass 14 is advanced through the various steps of the method.

The fiberglass 14 paid off the supply roll 10 is advantageously coated with an adhesion promoting and stiffening material, as to be more fully described hereafter. However, if the fiberglass tape 14 is not so pre-treated, then, according to the present invention, the woven fiberglass material is first pre-treated in a manner which will now be described. The raw fiberglass strip material is passed through a low viscosity bath of acrylic emulsion primer solution such as "Rhoplex A.C. 201", supplied by Rohm & Haas. However, any other low viscosity primers which are conventionally used to improve the adhesion between glass substrates and vinyl polymers may similarly be utilized. For example, silane-type primers which are conventionally used to improve adhesion of vinyl polymers to glass substrates have also been found satisfactory.

As mentioned above, an important characteristic of the primers, whether they be acrylic emulsion polymers or silane polymers, is that they have a relatively low viscosity. A low viscosity primer assures that the interstices of the foraminous woven fiberglass core material remain open subsequent to the pre-treating step.

The acrylic emulsion solution is thinned, prior to treating the fiberglass material, to approximately 20% solids by weight. In the case of Rhoplex A.C. 201, the solution is thinned from its normal 40% solids by weight.

The excess low viscosity acrylic emulsion solution is advantageously wiped off the tape to assure that the interstices in the fiberglass remain open or unfilled after pre-treatment.

The woven fiberglass tape to be coated is, for example, 64 warp per inch by 16 fill or woof per inch. The woven fiberglass tape 14 is foraminous and has interstices or openings in its surface which can represent approximately between 22 to 60% of the total surface area of the fiberglass strip or tape 14. The tape in accordance with the presently preferred embodiment has an effective open area of 20%. For reasons to be described hereafter, the interstices are to be left substantially open so that the initial effective open area is not substantially reduced by the pre-treating step. By wiping off or otherwise removing excess acrylic emulsion solution subsequent to passing the tape through a bath thereof, it is possible to substantially maintain the effective open area which is 20% or greater of the total area.

After the bath and the wiping steps, the tape is run through a radiant drying oven, or otherwise dried, to reduce the residual solvent volatiles plus water to under 10%. The evaporation of the volatiles plus water to further enhances the total effective open area of the interstices and the woven fiberglass material 14. The purpose of pre-treating the fiberglass tape material is to improve the stiffness and handling ease of the tape and also to improve and promote the adhesion of the vinyl material, to be applied in a subsequent step to be described, to the glass.

As described above, the fiberglass tape or strip 14 is paid off the supply roll 10 through a tension device 16 and then passed between a radiant heater 18 at which point the temperature of the fiberglass tape 14 is raised to approximately 350°F plus or minus 15°F. A typical length of the radiant heaters is 36 inches. The material passes through the system at speeds that range from 50 feet a minute to approximately 250 feet a minute. To adjust for the difference in heating effect for different rates of speed, the radiant heaters are advantageously equipped with a SCR input control to control the amount of radiant energy that impinges on the woven tape. Of course, any other conventional means for preheating the fiberglass maybe utilized, with different degrees of advantage. The purpose of preheating the fiberglass tape is to reduce the volatiles from a previous pre-treating step to under 2%. As described in my parent application Ser. No. 887,990, the other purpose for preheating the fiberglass tape is to improve the adhesion properties of the tape. More specifically, the fiberglass tape 14 is advantageously preheated by the radiant heater 18 to a temperature which is substantially equal to the extrusion temperatures of the plastic coatings which are to be deposited on the tape, as to be described.

The preheated tape 14 is advanced through an extrusion device 20 which includes upper and lower manifolds 22. The manifolds 22 communicates with upper and lower feeds 24. The feeds 24 are disposed to each side of a channel 26 provided for the passage of fiberglass tape 14. The extruding assembly 20 cooperates with a coating die plate 30 which includes beveled or tapered portions or surfaces 31. The surfaces 31 form, together with the extruding device 20, orifices 32 which converge to form a die opening 34.

The thermoplastic which is to be applied in the extrusion process may be any flexible vinyl resin compound. Such materials will be referred to in the specification as well as in the claims as plastics. Examples of suitable resins which are suitable include polyvinyl chloride, polyvinyl chloride-acetate, polyvinyl dichloride and polyvinylidene chloride. These resins are typically rigid, however, and plasticizers must be added to make the same flexible. Stabilizers, color and other required additives are also frequently added to the basic resin to provide desired qualities. One example of a suitable vinyl plastic is that supplied by B. F. Goodrich Chemical Co. and known as "Geon 8372". The Geon resin is extruded into and through the die at the normal processing temperatures which can vary from 310° to 370°F. The exact temperature selected depends on the operating rate of the machine and the wetting characteristics of the particular bath run but are within the normal recommended range for this particular material. Advantageously, the above mentioned plasticizers are non-migratory. A non-migratory plasticizer will be defined for the purposes of the specification as well as for the claims, as a plasticizer which does not leach out or flow out or otherwise separate from the vinyl resin material. Such flow or migration may result in the plasticizers reaching the interface where the bond is formed. Such migration of the plasticizers frequently weakens the adhesion bond. By eliminating plasticizer migration, the plasticizers also do not enter the primer material and the latter retains its desired characteristics. The use of a vinyl plastic as described assures that the product quality remains high after extended use.

As the pre-treated fiberglass tape 14 advances through the die opening 34, two ribbons, strips or sheets of the Geon resin or vinyl plastic material is extruded onto the tape. Each side of the heated fiberglass core material is coated with one of the respective ribbons. By forcing the now coated fiberglass material through a restricted die opening 34, the coated fiberglass strip is progressively compressed due to the tapered surfaces or portions 31 to thereby impart to the composite tape uniform desired thickness. Of equal importance is that the step of progressively compressing the coated core material causes portions of the opposing ribbons to be forced into the interstices or openings of the woven foraminous fiberglass core material. The extruded ribbons or sheets of plastic material, still in a soft state, are thereby caused to penetrate and fill the interstices from opposite sides. The die opening 34 is so selected so that sufficient pressures are applied to the coated woven fiberglass material and the two opposing strips of extruded plastic so that the latter are bonded to each other by penetrating and totally filling the interstices to form a unitary mass. In this connection, it should be mentioned that preheating of the treated strip in the radiant heater 18 assures that such bonding takes place between the two ribbons by substantially maintaining the extrusion temperatures of the strips so that the latter do not prematurely harden.

The die opening 34, in the presently preferred embodiment, is in the form of a rectangular slot having a height clearance equal to the thickness of the woven fiberglass material plus the combined thicknesses of the two vinyl ribbons deposited on each side of the fiberglass strip. The die opening 34 has a land length in the direction of extrusion or advancement of the coated tape in the order of 0.015 to 0.050 inches wide.

The spreading or thickness equalization of the vinyl ribbons causes the excess vinyl to be distributed to the sides of the fiberglass tape 14, where further bonding takes place between the opposing vinyl ribbons. In this manner, the fiberglass tape 14 becomes fully enclosed by the protective vinyl plastic.

After passing the coated fiberglass tape through the die opening 34, the composite material is advanced through a cooling tank 36 where it is quenched to essentially room temperature. Such quenching hardens the vinyl material and fixed the bonds between the two opposing vinyl ribbons and between the ribbons and the pre-treated fiberglass tape.

The cooled and now completed composite tape may be wound by way of an idler roller 38 onto a takeup roll or spool 40 which is mounted in a conventional manner by a shaft 42.

Referring to FIG. 2, the finished coated tape 50, as it emerges from the die opening 34 is illustrated. The composite tape 50 thereby comprises the fiberglass 14 core material surrounded by and substantially enclosed by a plastic coating or layer 52. The coating 52 generally comprises an upper ribbon 54 and a lower ribbon 56 respectively formed in the upper and lower portions of the extruding device 20. The progressive compression step through die opening 34 forces, as described above, the upper and lower ribbons 54, 56 to penetrate the interstices of the fiberglass tape material 14 as well as to flow over the sides or edge portions of the fiberglass tape 14. For this reason, the die opening 34 should advantageously have a width which is somewhat greater than the width of the fiberglass tape 14. Such increased width permits the upper and lower ribbons to flow around the edges of the fiberglass without causing the latter to become warped and also allows some freedom of movement of the fiberglass tape 14 through the die opening as it advances through the latter.

The composite tape manufactured in accordance with the above described method has improved characteristics which overcome many of the disadvantages described in the Background of the Invention associated with presently known composite tapes. For example, the stretch coefficients of the tapes according to the present invention is substantially a function of the stretch coefficient of the core material itself. By utilizing core materials which have relatively low stretch coefficients, such as woven fiberglass, very low stretch coefficients can be obtained. A composite tape utilizing a fiberglass core material having a 64 per inch warp and 16 per inch fill has a stretch coefficient essentially under 1%, under normal conditions. Similarly, the strength of the tape is a function of the strength of the core material. The test strength of the particular configuration under discussion is something in the order of 100 pounds. This, of course, as well in excess of the tensions that such tapes are normally subjected.

Another important feature of the present invention is the resistance of the resulting composite tape 50 to mistreatment, bending, folding and so forth. The tape does not wrinkle, or crack or take permanent kinks. Of equal importance is the facility of which the resulting tapes are printed. The printing remains permanent because it becomes integrally fused to the vinyl material 52.

Other characteristics of the tape are equally advantageous for consumer or professional use. Thus, the composite remains flexible at temperatures down to minus 40°F and it is probably useful to temperatures over 160°F.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A method of forming a composite tape having a foraminous fiberglass core, comprising the steps of treating a continuous strip of foraminous core material with adhesion promoting and stiffening material; preheating the continuous strip of the foraminous core material; passing the core material through an extrusion head and die of a resin material extrusion device and extruding the resin material therethrough; applying a coating of resin material to each side of the fiberglass core material during the course of passage through the extrusion head and prior to its emergence from the extrusion die; maintaining the resin material at substantially the extrusion pressure during passage of the core material through the die to force the same into the interstices of the foraminous core material prior to emergence from the die opening to impart a uniform layer of resin material about the fiberglass core material; and cooling the resulting composite tape to a temperature which substantially hardens the coated plastic ribbon material.

2. A method of forming a composite tape as defined in claim 1, wherein said treating step comprises advancing the continuous strip of foraminous material through a bath of acrylic emulsion solution which improves adhesion between the fiberglass core material and vinyl plastic polymers.

3. A method of forming a composite tape as defined in claim 2, further comprising the step of first thinning said acrylic emulsion solution to 20 percent solids by weight by addition of water.

4. A method of forming a composite tape as defined in claim 2, further comprising the step of drying the treated strip of foraminous material to reduce the residual volatile solvent and water to under 10%.

5. A method of forming a composite tape as defined in claim 4, further including the step of removing excess acrylic emulsion solution subsequent to advancing the strip through the bath and prior to drying the heated strip.

6. A method of forming a composite tape as defined in claim 2, wherein said preheating step comprises heating fiberglass material to reduce the volatiles in the solution to under 2%.

7. A method of forming a composite tape as defined in claim 1, wherein said preheating step comprises heating the fiberglass material to approximately between 335° and 365°F.

8. A method of forming a composite tape as defined in claim 1, wherein said preheating step comprises heating the fiberglass material to a temperature substantially equal to the extrusion temperature of the ribbons of plastic material.

9. A method of forming a composite tape as defined in claim 1, further comprising the step of tensioning the strip of foraminous material prior to said preheating step.

10. A method of forming a composite tape as defined in claim 1, wherein said extruding step comprises extruding a vinyl polymer.

11. A method of forming a composite tape as defined in claim 10, wherein said vinyl polymer thermoplastic contains non-migratory epoxy-type plasticizers.

12. A method of forming a composite tape as defined in claim 1, wherein said interstices in the strip of foraminous material represent an effective open area of approximately between 20 and 60 percent, and wherein said pressure maintaining step comprises progressively applying increased pressures to the coated core material and causing the opposing ribbons to fuse to each other by penetrating and filling said interstices to form a unitary mass.

13. A method of forming a composite tape as defined in claim 1, wherein said cooling step comprises the step of quenching the composite tape in a cooling tank to essentially room temperature.

14. A method of forming a composite tape as defined in claim 1, wherein said extruding step comprises extruding a non-migratory vinyl plastic.

15. A method of forming a composite tape as defined in claim 1, wherein the step of passing the core material through the die comprises passing the core material through a substantially rectangular slot having a height clearance equal to the desired thickness of said core material and the combined thicknesses of two coatings deposited on each side of the core material and a width clearance substantially equal to the width of said core material.

16. A composite tape comprising an elongate foraminous strip of fiberglass core material; a coating of vinyl polymer plastic material having substantially uniform thickness enclosing said core material along its length, said coating comprising two opposing ribbons one on each side of said strip at least portions of which penetrate and fill the interstices to form a unitary bonded mass; and an adhesion promoting and stiffening agent between said strip of fiberglass and said vinyl plastic material which promotes the bonding properties between said strip and plastic material and improves the stiffness and handling ease of the tape.

17. A composite tape as defined in claim 15, wherein said unfilled interstices in said strip of foraminous material represents an open area of approximately between 20 and 60 percent.

18. A composite tape as defined in claim 15, wherein said vinyl polymer thermoplastic contains non-migratory epoxy-tape plasticizers.

19. A composite tape as defined in claim 18, wherein said agent contains residual volatiles plus water under 2%.

* * * * *